Figure 1:
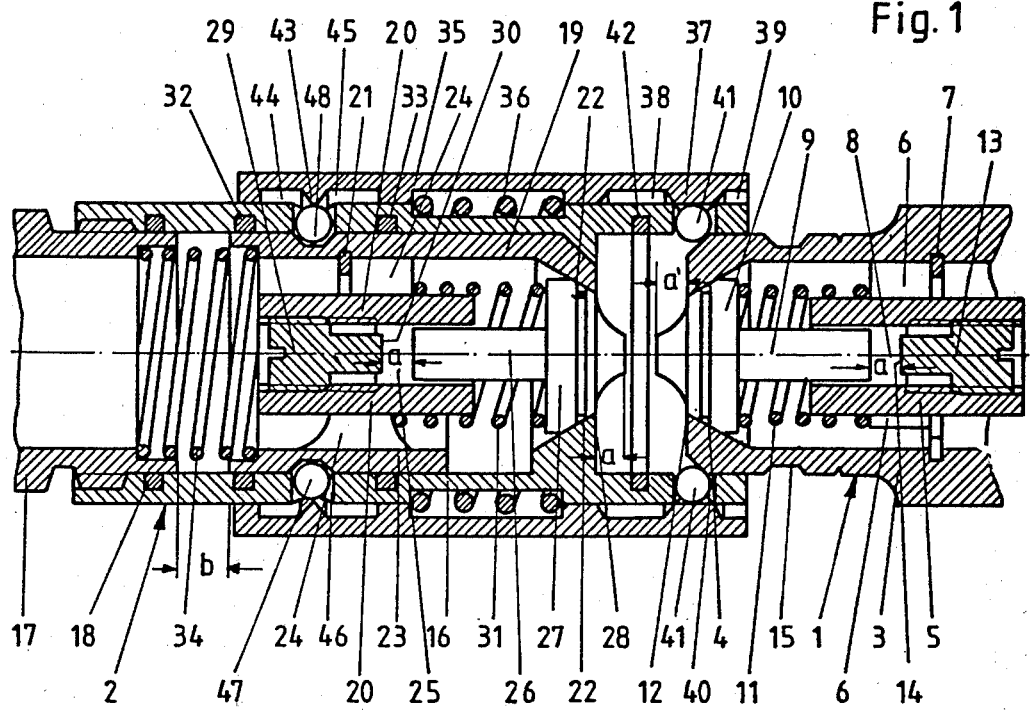

United States Patent [19]

Steuerwald

[11] 4,388,947
[45] Jun. 21, 1983

[54] RAPID COUPLING WHICH IS OPERABLE EVEN UNDER PRESSURE

[75] Inventor: Alfred Steuerwald, Orbis, Fed. Rep. of Germany

[73] Assignee: Aeroquip GmbH, Hann Münden, Fed. Rep. of Germany

[21] Appl. No.: 233,659

[22] Filed: Feb. 11, 1981

[30] Foreign Application Priority Data

Feb. 14, 1980 [DE] Fed. Rep. of Germany ....... 3005490
Oct. 16, 1980 [DE] Fed. Rep. of Germany ....... 3039072

[51] Int. Cl.³ .............................................. F16L 37/28
[52] U.S. Cl. .......................... 137/614.06; 137/614.05; 137/557
[58] Field of Search .............. 137/614, 614.01, 614.02, 137/614.04, 614.05, 614.06, 553

[56] References Cited

U.S. PATENT DOCUMENTS

| 3,482,602 | 12/1969 | Jarnagan et al. | 137/614.05 |
| 3,674,051 | 7/1972 | Stratmon | 137/614.04 |
| 3,791,411 | 2/1974 | Bogeskov et al. | 137/614.02 |
| 4,200,121 | 4/1980 | Walter et al. | 137/614 |
| 4,274,441 | 6/1981 | Fischer | 137/614.05 |

Primary Examiner—A. Michael Chambers
Attorney, Agent, or Firm—Max Fogiel

[57] ABSTRACT

The invention relates to a quick coupling which is operable even under pressure, particularly for hydraulic lines, composed of two matable coupling halves in form of a plug and socket valve which can be arrested in the coupled position via a ball-locking arrangement, and which each have a valve body which is biased to closing position by closing springs and in the uncoupled condition of the coupling halves is held in closed condition, being guided in a star body which is mounted in a coupling body, of which one of the coupling halves has a fixed abutment which limits the stroke of the valve body in its open position, whereas the valve body of the other coupling half can perform a stroke equal to double the valve stroke of the other valve body and at the end of the single valve stroke a disengageable and engageable abutment is provided for releasing the double valve stroke respectively arresting this valve body in an open position corresponding to the single valve stroke.

14 Claims, 8 Drawing Figures

RAPID COUPLING WHICH IS OPERABLE EVEN UNDER PRESSURE

Such a quick coupling is known from U.S. Pat. No. 3,791,411 and also from German Allowed Application No. 2,712,117. As a rule it is the valve body of the plug-valve which is mounted in the star body for shifting only by the single opening stroke, the star body itself forming a fixed abutment for the delimitation of the single valve stroke of the valve body. According to U.S. Pat. No. 3,791,411 the star body can be adjusted relative to the coupling body of the plug valve with the aid of a thread. The two socket valves also have a valve body which is biased in closing direction via a closing spring, but which as a rule is mounted shiftably in the coupling body of the socket valve for displacement by double the single valve stroke.

In the embodiment according to U.S. Pat. No. 3,791,411 the valve body of the socket valve is of tubular shape. The coupling body of the socket valve is divided and consists of a stationary part and a part movable relative to the same which receives the tubular valve body. An arresting means is provided within the tubular valve body for arresting the valve body of the socket valve in the coupling position between the plug and the socket and in the open position of both valve bodies. This arresting means consists of an operating bolt mounted in the tubular valve body in which in radial arrangement a single locking ball is provided which is spring biased. This locking means permits the locking of the operating bolt, the valve body and a part of the coupling body. Due to the separated construction of the coupling body the seal and the flow guidance in the socket valve are difficult and complicated. A plurality of essentially radially extending bores and guide channels must be provided in order to direct the flow media about the interior arranged locking means through the coupling connection. A corresponding pressure drop is among the disadvantages of this construction. The major disadvantage, however, is to be seen in that the locking means is arranged in the interior of the coupling in a very small diameter space, i.e. must be of very small construction if the maximum diameter of the socket valve is not to be too large. Particularly for small nominal widths, however, this results in a coupling which is of relatively large diameter. It is also disadvantageous that the drive means for the locking means, namely the spring, must also be mounted radially for which again only a very limited amount of space is available. Beyond this, this locking for the locking means also acts only eccentrically upon the socket valve so that a uniform stress distribution over the circumference does not exist. A further disadvantage of this construction resides in that it is not possible to determine from outside whether the locking means is properly engaged in the locked position or whether for example after breakage of the spring the locking function does not exist at all any more. Finally, this construction is very complicated. Since the single valve stroke of the valve body of the socket valve is not adjustable, difficulties may arise on coupling of the socket valve with different plug valves.

In the construction according to German Allowed Application No. 2,712,117 the flow guidance is solved in a comparatively better manner, so that here in particular a comparable pressure drop due to changes in flow direction is not to be expected. However, here also the locking means is disadvantageously arranged within the flow cross-section of the socket valve and arranged and effective between the star body and the valve body. This means that here also the locking means due to its radial arrangement and mounting engages the valve body eccentrically over a small diameter, which is not an optimum solution with respect to the transmission of pressure forces from the flow medium to the valve body and with respect to the support of these forces. Also, the individual parts of the locking means can be only of limited size, which is also disadvantageous. Since the star body of the socket valve and the plug valve are not adjustable in their relative position, an exceedingly precise tolerance maintenance during manufacture of the parts is necessary, in order to obtain a proper operation of the locking means, i.e. to engage an abutment even when the single valve stroke has reliably been completed. Different plugs with a socket respectively vice versa the parts therefore may accidentally be so combined in such tolerances that the effect of the locking means does not occur at all. In this construction there is also the further disadvantage that it is not possible to determine from the exterior whether the locking means properly fulfills its function, i.e. whether for example the inserted spring of the locking means has not broken. In the case of small nominal widths this known coupling also is of relatively large diameter because the locking means in the interior requires a certain minimum dimension.

To at least partially counteract the disadvantage of the eccentric force transmission of the locking means to the valve body, it is known from German Published Application No. 2,715,417 to construct and arrange a part of the locking means, namely a cascade, symmetrically with reference to the longitudinal axis of the coupling, which then again engages in eccentric manner in recesses of the shaft of the valve body. In this construction the locking means is arranged immediately between the star body and the shaft of the valve body, i.e. in the interior, so that from the exterior it cannot be determined whether the locking means in the appropriate position is properly locked or not.

Finally, the German Allowed Application No. 2,724,630 discloses a coupling which in contradistinction to the previously described couplings cannot be coupled under pressure. In a manner otherwise already known the sliding sleeve for operation of the ball-locking arrangement for securing the coupled condition respectively release to the uncoupled condition is, however, arranged and effective between the coupling valve and the socket so as to operate in both directions. Furthermore, here also the coupling body is of separated construction, with one part being axially shiftably mounted relative to the other. Since the plug valve has no valve body, the valve body of the socket valve must be shiftably mounted through a corresponding opening stroke.

The purpose of the invention is to so further develop a quick coupling of the type described hereinbefore which can be coupled under pressure, that no problems arise with respect to the arrangement of the locking means—which is constructed as a disengagable and engagable abutment—for locking the valve body capable of performing the double valve stroke in the position corresponding to the single stroke. It is to be possible even in the case of small nominal widths to maintain the diameter of the coupling halves correspondingly small. In a further development of the invention it is desired that even at higher and higher operating pressures a reliable automatic closing of the second ball-coupling arrangement is obtained after closing of the first ball-coupling arrangement.

According to the invention this is achieved in that the star body of the coupling half having the double valve stroke is axially shiftably mounted in the coupling body in correspondence with at least the single valve stroke, and that the disengagable and engagable abutment is arranged between the star body and the coupling body. The new quick coupling thus basically departs from the state of the art, in that the locking means is not located in the interior, i.e. within the flow cross section, but outside the same and thus arranged over a larger diameter. Thus, the individual parts of a disengagable and engagable abutment of a corresponding locking arrangement can be constructively accommodated in a sensible size, and the particular advantage is obtained that a symmetrical force engagement respectively force support about the longitudinal axis of the coupling halves can be achieved without problems. Since the disengagable and engagable abutment is no longer located in the interior, but in connection with the coupling body, the further advantage is obtained that on appropriate configuration it can be determined from the exterior without any difficulty whether a properly locked position after coupling of the coupling halves is obtained relative to the engagable and disengagable abutment, or not. In the coupled position it is visible at the exterior on the coupling that the open position of the valve body, which has double the valve stroke, is properly locked. This constitutes a significant increase of the safety in use. The new quick coupling has the further advantage that after completion of the coupling operation, when the sliding sleeve has reached its proper end position, the two valve bodies are locked even when two pressure-less lines have been coupled with one another; in the state of the art in such a condition the line connection can be locked once, during pressure variations i.e. the passage may be interrupted, before locking is achieved. Without one-time blocking a locking is not obtained.

The star body may itself and directly be shiftably mounted in the coupling body, whereby here at least a stroke corresponding to the single valve stroke must be provided. The increase of this stroke is not disadvantageous in any case, however, but instead—particularly with respect to the combination possibilities with different plug valves—has only positive effects. However, it is also possible to provide a separate seating sleeve between the star body and coupling body which carries the valve seat, against which the star body is supported and between which and the coupling body the disengagable and engagable abutment is provided. It is also possible that this seating sleeve does not carry the valve seat. In all these instances, however, the disengagable and engagable abutment respectively the essential blocking part thereof, is arranged over a relatively large diameter.

The star body respectively the seating sleeve is supported against the coupling body via a pressure spring acting in closing direction of the valve body, the pressure spring being stronger than the closing spring of the valve body. The possibility exists to arrange the pressure spring in axial direction and thus to depart from the radial constructions known from the state of the art. In axial direction an appropriate length is available without any problem in a coupling. The coordination of the forces between the pressure spring on the one hand and the closing spring on the other hand determines the sequence in which the valve body of for example the socket valve is opened when the plug valve body is under pressure. If the arrangement is so selected as described, then the valve body of the socket valve opens initially. In the second part of the valve stroke the valve body and the star body move jointly relative to the coupling body. In addition, this assures that in a simple manner the valve body of the for example socket valve cannot move to a closure position relative to the seat during its return movement after the double opening stroke to the position of the single opening stroke.

It is particularly advantageous if the star body with the larger stroke than the single valve stroke of its valve body is shiftably mounted in the coupling body. This assures that different plug valves can always be coupled with one and the same socket valves and vice versa, and that tolerance variations in the manufacture of the individual parts have no disadvantageous consequences.

The disengagable and engagable abutment is adjustably constructed, to eliminate tolerance variations in axial direction and to permit adjusting of the abutment in such a manner that a play-free locking of the two valve bodies is possible in the coupled condition.

The disengagable and engagable abutment for the stroke of the valve body advantageously consists of a ball-locking arrangement and a setting screw mounted in the star body. For operation of the ball-locking arrangement a sliding sleeve may be provided which is shiftably mounted on the circumference of the coupling body against spring pressure, and which preferably permits in both operating directions a release of the ball-locking arrangement. As an example, the construction of the so-called sliding sleeve offers itself which is already known in known per se so-called push-pull couplings in both directions and provided subsequent to a locking cam with shunting grooves. It is also possible to provide a common sliding sleeve for the operation of the ball-locking arrangement of the engagable and disengagable abutment and the ball-locking arrangement for the coupling respectively uncoupling of the two coupling halves, so that a simplified operation is obtained. It is then particularly important that the locking means is not moved into its disengagable position permitting the double valve stroke at the time of uncoupling of the coupling halves, but that the disengaging position is released simultaneously with the disengaging of the ball-coupling arrangement for the coupling halves. To obtain an advantageous locking sequence between the two ball-locking arrangements, the common sliding sleeve may have one each locking cam and adjacent at least at one side shunting grooves for the balls of the two ball-locking arrangements, with the two locking cams being coordinated with one another and the locking cam of the ball-coupling arrangement of the engagable and disengagable abutment having a comparably smaller axial width. This makes it possible for the ball-locking arrangement for the two coupling halves to already have closed, i.e. to have moved into the locked position, without the other ball-coupling arrangement having already being locked. This, however, necessarily requires that the sliding sleeve is not yet relative to the coupling body in its end position corresponding to proper locking of both ball-coupling arrangements. Thus, it is visible from the exterior that only one ball-locking arrangement is effective. Only when pressure is supplied via the previously pressure-less conduit part, will the ball-locking arrangement of the engagable and disengagable abutment also move into its locking position, whereby then the sliding sleeve assumes its end position. If, however, the two coupling halves are coupled with one another without one of the two halves being under pressure, then due to appropriate dimensioning of the forces of the pressure spring on the one side and the closing spring on the other side such an intermediate position can be avoided or deliberately caused. The coupling sleeve may have, relative to the sliding sleeve, one or two marks for indicating the engaged abutment and/or for indicating the coupled condition. In case of construction as a push-pull coupling the number of marks is doubled.

Even in the case of high and highest operating pressures a reliable automatic closing of the second ball-locking arrangement is achieved in that the locking cam is axially shiftably mounted on the common sliding sleeve and is spring biased to the center position of its stroke. The locking cam of the second ball-locking arrangement is thus made movable relative to the common sliding sleeve, being mounted for limited axial shifting and spring biased in its center position, so that it tends always to assume this center position. On the other hand, the locking cam is however not prevented from shifting axially sideways if appropriate forces act upon it. Since in such couplings on opening after appropriate pressure application of the coupling socket it is always the position which is reached at which the valve body of the coupling socket which can perform the doubled valve stroke is to be fixed on the single valve stroke, the spring force and the axially movable locking cam can cleverly be used to assure that the same performs a relative movement even if the common sliding sleeve is prevented from such a move by the force exerted radially by the balls of the first ball-locking arrangement.

It is particularly advantageous if the locking cam is configured as a ring and axially shiftably mounted for limited displacement in a recess formed by the shunting grooves of the common sliding sleeve, with two approximately equally strong springs being mounted on the annular locking cam to the right and to the left. The springs are advantageously appropriately prestressed, with the annular locking cam having the possibility of being provided on its inner side with inclined faces for the balls. This facilitates the closing of the second ball-locking arrangement.

The two springs are arranged outside the radial path of movement of the balls, so that they are not clamped by the balls and can transmit their axially directed force to the annular locking cam in any position.

Exemplary embodiments of the invention are illustrated in the drawings, always in combined half sections, and are described in the following.

Figure 2:
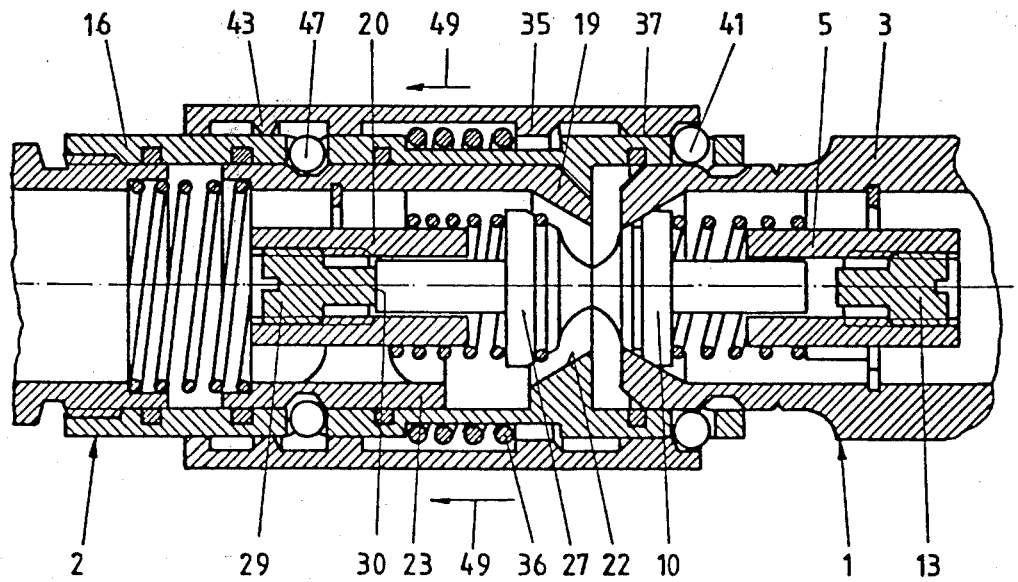
Figure 3:
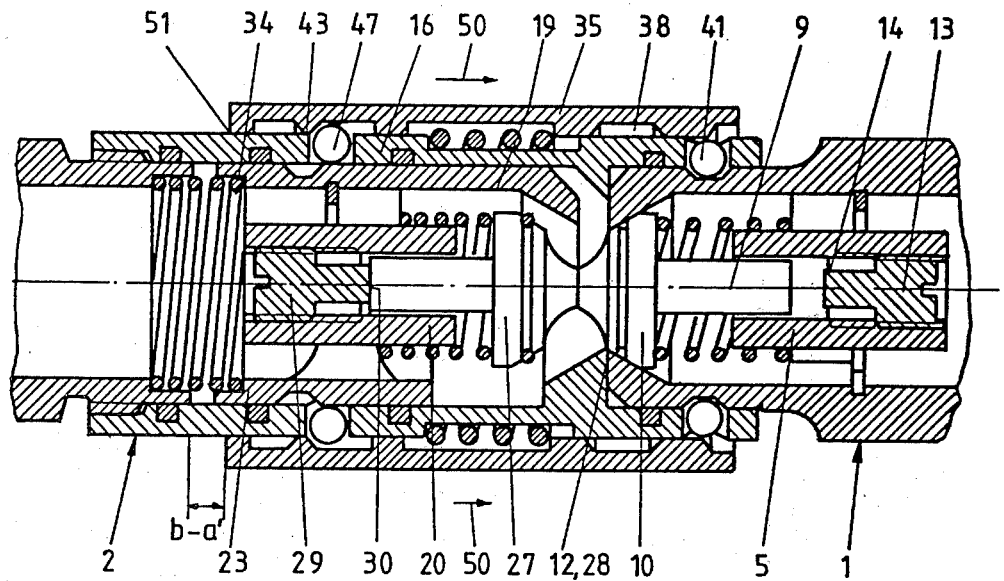
Figure 4:
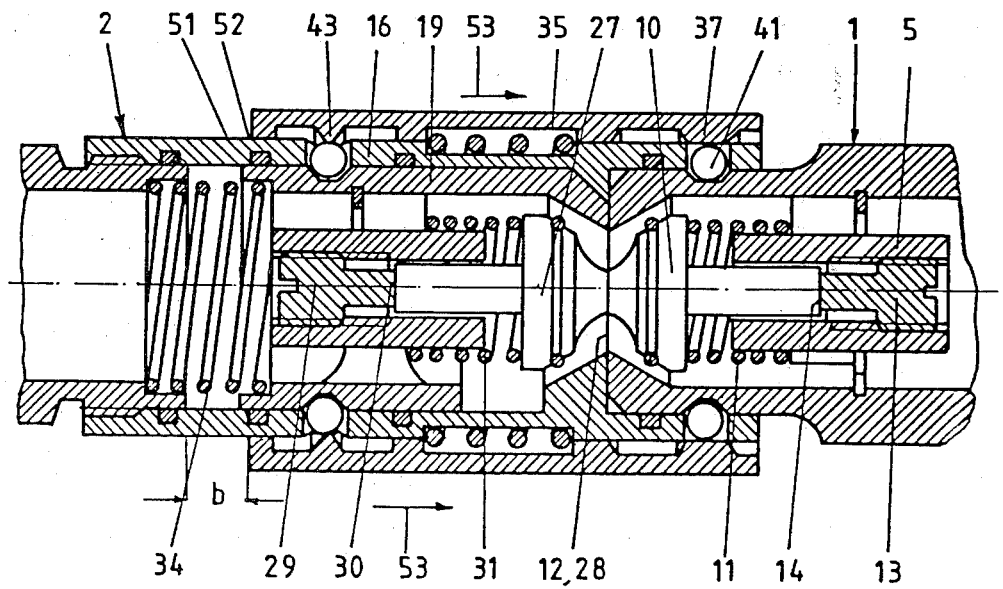
Figure 5:
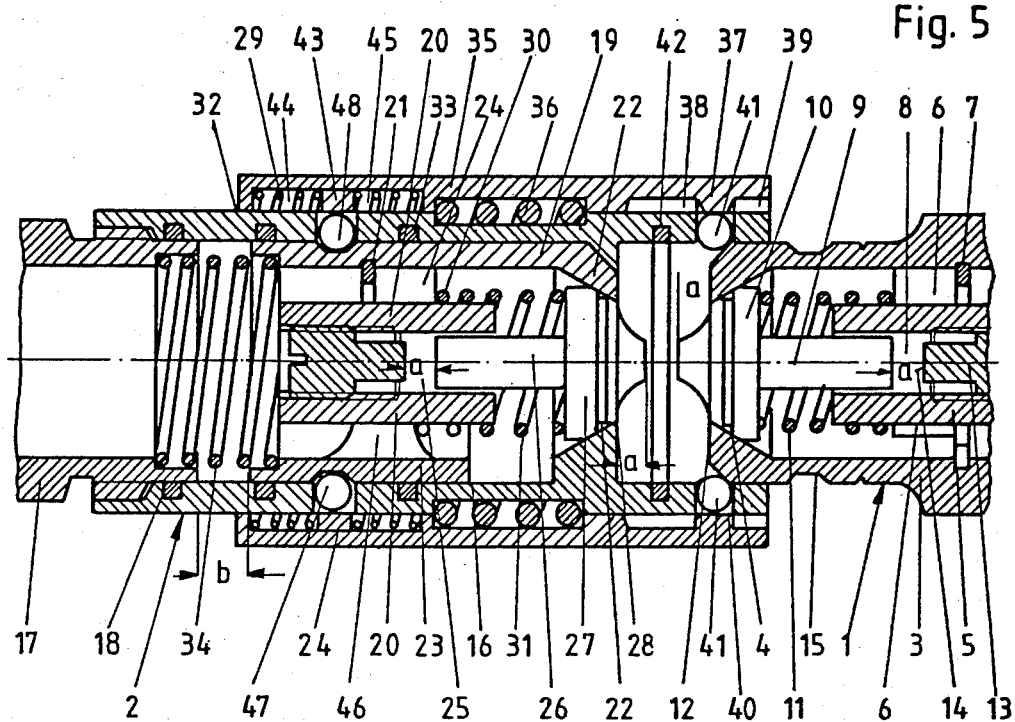
Figure 6:
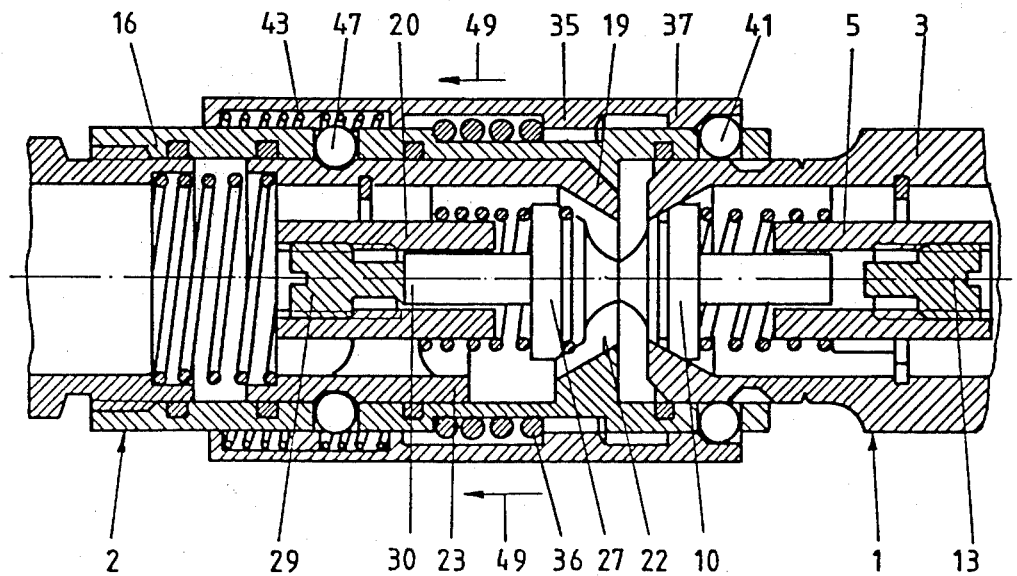
Figure 7:
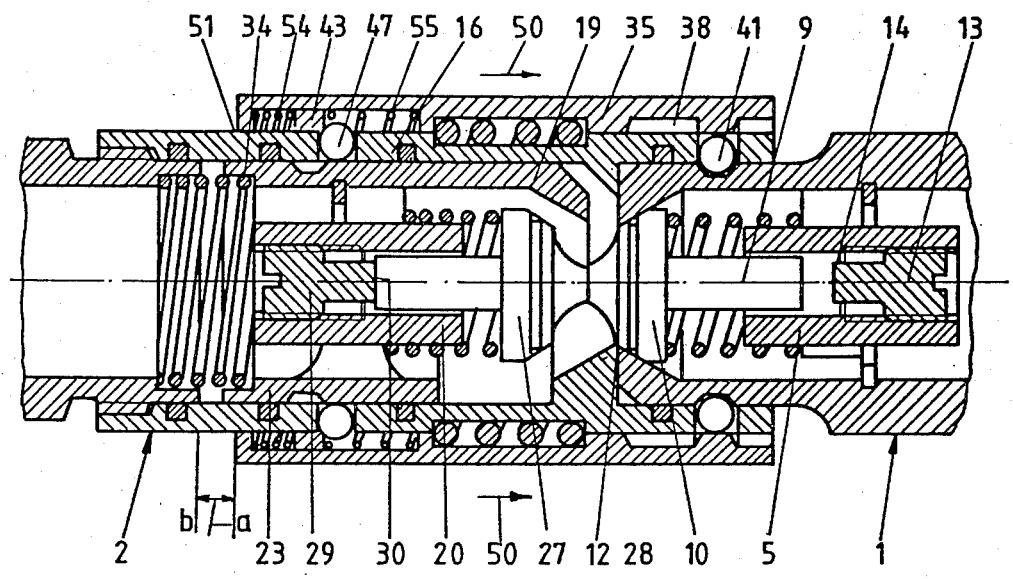
Figure 8:
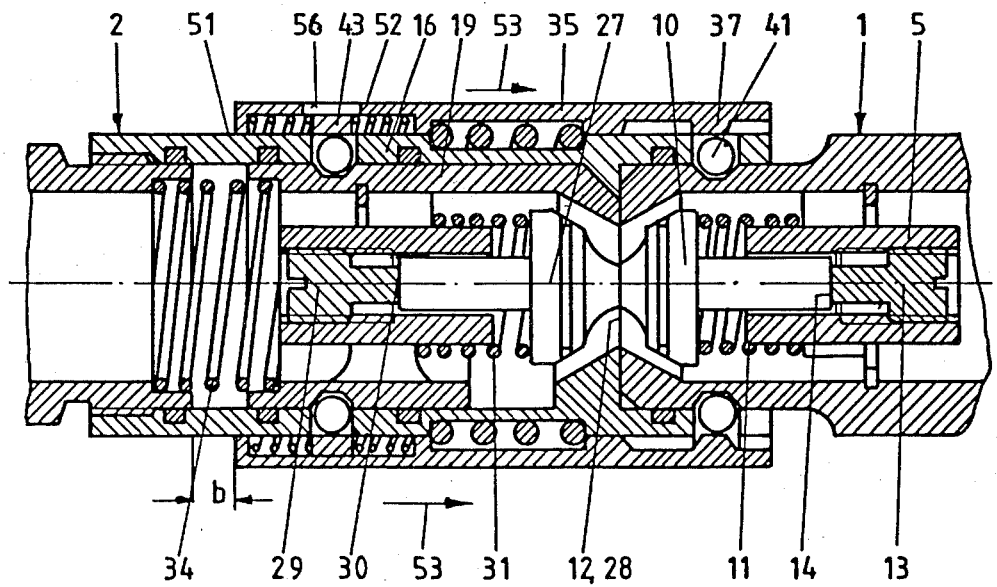

FIG. 1 shows a section through the first two embodiments of the quick coupling on insertion of the plug valve into the socket valve, FIG. 2 is a section through the first two embodiments during coupling after release of the two ball-locking arrangements, FIG. 3 is a section through the first two embodiments of the quick coupling in a further state of the coupling movement, FIG. 4 is a section through the two first embodiments of the quick coupling in coupled and locked position, FIG. 5 is a section through two further embodiments of the quick coupling on entry of the plug valve into the socket valve, FIG. 6 is a section through the further embodiments during coupling after release of the two ball-locking arrangements, FIG. 7 is a section through the further embodiments of the quick coupling in a further state of the coupling movement, and FIG. 8 is a section through the further embodiments of the quick coupling in coupled and locked condition of the two ball-locking arrangements.

Each quick coupling basically consists of a plug valve 1 and a socket valve 2. Only a single embodiment is shown of the plug valve 1, whereas the socket valve is shown in a first embodiment in the upper half of the drawing and in a second embodiment in the lower half of the drawing, in all figures.

The plug valve 1 consists essentially of a coupling body 3 with a seat 4. The star body 5, having three arms 6 which are distributed over the circumference, is mounted in the coupling body 3 with the aid of the safety ring 7. Otherwise, the star body 5 is of sleeve-shaped configuration and has centrally a bore 8 in which the shaft 9 of a valve body 10 is slidably guided. The valve body 10 forms with the seat 4 of the coupling body 3 a check valve 10, 4 which, as shown, closes the corresponding line which is connected with the plug valve 1. The valve body 10 is pressed against the seat 4 with the aid of a closing spring 11 which on the other hand holds the star body 5 in abutment against the safety ring 7. The valve body 10 extends in closed condition beyond the end wall 12 of the plug valve 1 by the dimension a'. Further mounted in the bore 8, with the aid of a thread, is a setting screw 13 the front end of which constitutes an abutment 14 for the end of the shaft 9 respectively the valve body. The setting screw 13 is so set in the star body 5 with the aid of the thread that the abutment 14 is located spaced from the end of the shaft 9 of the valve body 10 by the distance a'. The valve body 10 thus can perform between its open position and its closed position the valve stroke a'.

The coupling body 3 has at the illustrated location a circumferential locking groove 15 which cooperates with a still to be described ball-locking arrangement for locking the plug valve 1 with the socket valve 2 in the coupled position and for release of the two parts 1, 2 in the uncoupled position.

Similar to the plug valve 1 the socket valve 2 has a coupling body 16 which is threaded onto a connecting part 17, with a seal 18 serving to pressure tightly close the interior space. In the respectively proper illustrated embodiment a seat sleeve 19 is shiftably mounted in the coupling body 16, in which a star body 20 is mounted with the aid of the safety ring 21. The seating sleeve 19 carries the seat 22. In the embodiment shown always in the lower half of each drawing the separate provision of the seating sleeve 19 is omitted. Instead, the star body 20 is directly shiftably mounted in the coupling body 16. For this purpose the star body 20 is provided in the second embodiment with a gliding sleeve 23. In both cases the star body 20 has for example three radially projecting arms 24 between which flow can take place as considered over the circumference. In the embodiment of the star body 20 with the gliding sleeve 23 the seat 22 is formed by the coupling body 16.

Similarly as in the plug valve 1 the socket valve 2 also has provided centrally at the star body 20 a bore 25 which slidably receives the shaft 26 of the valve body 27. The valve body 27 forms together with the seat 22 the check valve 22, 27 of the socket valve 2. The front end of the valve body 22 extends beyond the end plane 28 by the measure a. A setting screw 29 is adjustable and settably arranged in the star body 20 with the aid of a thread, and its front end constitutes an abutment 30 for the rear end of the shaft 26 respectively of the valve body 27. The setting screw 29 is so adjusted that on opening the valve body 27 can perform the valve stroke a before it engages the abutment 30 with its shaft 26, which abutment is also designated as an engagable and disengagable abutment 30. A closing spring 31 is interposed between the star body 20 and the valve body 27. The valve stroke a of the socket valve 2 corresponds approximately to the valve stroke a' of the plug valve 1. Both valve strokes a and a' differ other only by tolerance variations caused by the manufacture. Basically, the same measure is desired and set during the manufacture.

The star body 20 in the upper embodiment is axially shiftably mounted via the seat sleeve 19 respectively with the same, and in the lower embodiment it is axially shiftably mounted directly via its glide sleeve 23 in the coupling body 16, the two seals 32 and 33 being provided for sealing purposes. This achieves in both instances that the star body 20 is axially shiftable relative to the coupling body 16 by the dimension b. The dimension b is at least equally as large as the valve stroke a' (respectively a), but is made larger to obtain simplified manufacture. In any case this makes it possible for the valve body 27 of the socket valve 2 to be shiftably mounted by double the valve stroke 2a, whereas the valve body 10 of the plug valve 1 is shiftable only by the single valve stroke a'. The star body 20 with its glide sleeve 23 respectively the separate seating sleeve 19 are supported via a pressure spring 34 on the connecting part 17 or on an abutment of the coupling body 16. The force of the pressure spring 34 is selected greater than the force of the closing spring 31, so that in this manner a clear time sequence of the relative movements is predetermined.

The coupling body 16 is surrounded by a sliding sleeve 35 which here is configured as a common sliding sleeve and serves for activating two different ball-locking arrangements, as will be described subsequently. The sliding sleeve is mounted shiftable on the coupling body 16 with the aid of the spring 36 in both directions. The complete quick coupling is constructed as a so-called pull-push coupling, i.e. the sliding sleeve 35 can be shifted in both directions relative to the coupling body for the purpose of releasing the two ball-locking arrangements.

Specifically, the sliding sleeve 35 has a locking cam 37 which is relatively broad and which is hollowed by two shunting grooves 38 and 39 in both directions. At the location of the locking cam 37 the coupling body 16 has in known manner a series of radial cutouts 40 in which balls 41 are received. The locking cam 37 forms in conjunction with the shunting grooves 38, 39 of the balls 41 and the locking groove 15 of the plug valve 1 a first ball-type locking arrangement 15, 37, 38, 39, 40, 41 which serve to arrest the plug valve 1 and the socket valve 2 in the coupled position respectively for release of the two parts in the uncoupled position. Such ball-locking arrangements are known per se and therefore require no further description.

For sealing between the plug valve 1 and the socket valve 2 a further seal 42 is provided on the coupling body 16 of the socket valve 2.

The common sliding sleeve 35 serves simultaneously for operation of a second ball-locking arrangement. For this purpose the sliding sleeve 35 has a further circumferentially configured locking cam 43 which is comparatively less broad with reference to the locking cam 37.

In the embodiments of FIGS. 5–8 a circumferentially annular locking cam 43 is axially shiftably mounted on the sliding sleeve 35 and can be comparatively less wide with respect to the locking cam 37. At both sides the locking cam 43 is again followed by shunting grooves 44 and 45. Associated with these respectively with the locking cam 43, the coupling body 16 (FIGS. 1–8) has several cutouts 46 which are distributed over the circumference for receiving the balls 47. A circumferential locking groove 48 is formed exteriorly on the seating sleeve 19 respectively in the glide sleeve 23 of the star body 20. The locking cam 43 forms in combination with the shunting grooves 44, 45, the cutouts 46 in the coupling body 16, the balls 47 and the locking groove 48 the second ball-locking arrangement 43–48, which serves for locking the star body 20 relative to the coupling body 16 respectively for release in its other position. The second ball-locking arrangement 43–48 forms in combination with the abutment 30 on the setting screw 29 of the star body 20 an engagable and disengagable abutment for limiting respectively releasing the axial movement of the valve body 27. When the second ball-locking arrangement 43–48 is locked, as shown in FIG. 1, the abutment 30 is engaged so that the valve body 27 can perform at maximum the single valve stroke a, if a corresponding force is exerted upon the tip of the valve body 27 which serves to overcome the force of the closing spring 31. If, however, the second ball-locking arrangement 43–48 is disengaged respectively released, as for example shown in FIG. 2, then the valve body 27 can perform not only the single valve stroke a but can perform relative to the end plane 28 the double valve stroke which is composed of the sum of the individual valve strokes a+a′2×a.

In the embodiments of FIGS. 5–8 the shunting grooves 44 and 45 form an axially continuous recess in which the annular locking cam 43 is mounted with relative axial shifting freedom with respect to the common sliding sleeve 35 and is spring biased by two springs 54 and 55 in direction towards the axial center position of its stroke.

It is understood that in place of the common sliding sleeve 35 it would also be possible to provide a sliding sleeve each for activating the first ball-locking arrangement 15, 37–41 and a further sliding sleeve for activating the second ball-locking arrangement 43–48. In this case, also, the locking cam 43 according to FIGS. 5–8 could be axially shiftably mounted in the one sliding sleeve. The common sliding sleeve 35 for activating both ball-locking arrangements does, however, significantly simplify the operation (FIGS. 1–8).

With respect to the operation, there will now be first discussed the embodiment illustrated in the lower half of the four FIGS.:

The quick coupling can be coupled even under pressure, i.e. one line of the two to be connected line parts can be under pressure. In the embodiment illustrated in the drawing it may be assumed that the line which is connected to the plug valve 1 is under pressure so that the check valve 4, 10 is acted upon not only by the pressure of the closing spring 11, but also by the pressure of the introduced medium and held in the closing position. The line connected to the socket valve 2 is without pressure. On insertion of the plug valve 1 into the socket valve 2 the parts can initially be inserted into each other as far as indicated in FIG. 1. The bevel at the end wall 12 thus abuts against the balls 41 of the first ball-locking arrangement 15, 37–41, which is in the locked position. Subsequently the sliding sleeve 35 is shifted relative to the coupling body 16 in the direction indicated by the arrows 49 in FIG. 2 (or in the opposite direction), so that both the first ball-locking arrangement 15, 37–41 and also the second ball-locking arrangement 43–48 are released respectively disengaged. In the embodiments in FIGS. 5–8 the springs 54 and 55 hold respectively shift the locking cam 43 to its center position. In all embodiments the balls 41 can escape into the shunting groove 39 so that the plug valve 1 can be further inserted into the socket valve 2. Since the check valve 4, 10 is maintained in its closed position by the pressure of the enclosed medium, the check valve 22, 27 opens on continuation of the insertion movement in that the valve body 27 performs the simple valve stroke a and thus moves with its shaft 26 against the abutment 30. This intermediate position is shown in FIG. 2. Since the closing spring 31 is weaker than the pressure spring 34 the valve body 27 will first shift relative to the star body 20, as shown in FIG. 2. If, however, the closing spring 31 were stronger than the pressure spring 34, then initially the star body 20 would shift relative to the coupling body 16. Since the shifting of the sliding sleeve 35 also has permitted the second ball-locking arrangement 43–48 to move to the release position, the plug valve 1 can be inserted still further into the socket valve 2 with the check valve 10, 4 closed, but now the star body 20 is entrained via the abutment 30 so that the dimension b is reduced. The valve body 27 now performs in addition to the single valve stroke a a further valve stroke a, so that the valve body 27 performs approximately the double valve stroke 2a. This position of the parts is shown in FIG. 3. It is understood that the balls 47 move out of the locking groove 48 and have been shifted into the shunting groove 45. After release of the sliding sleeve 35 the same has moved in the direction of the arrows 50 in FIG. 3, so that the first ball-locking arrangement 15, 37–41 has already returned into its closure position whereas the second ball-locking arrangement 43–48 is still open. For the embodiments of FIGS. 5–8 the spring 54 is compressed and the spring 55 is partially relieved. This means, as shown in FIGS. 3–7, that the plug valve 1 is already coupled with the socket valve 2 so that the plug can no longer be pulled or pushed out of the socket valve 2. A mark 51 provided on the outer circumference of the coupling body 16, for example in form of a circumferential kerf, overlaps in this position with the end wall of the sliding sleeve 35 (FIG. 3), so that it can be seen from the exterior of the quick coupling that the first ball-locking arrangement 15, 37–41 is already in the locked position and with respect to FIGS. 1–4 that the second ball-locking arrangement 43–48 is not yet locked.

If pressure is now supplied to the line which is connected with the socket valve 2, for example by switching on the pressure medium source, then the pressure medium flows via the intermediate spaces between the arms 24 and the opened check valve 22, 27 against the valve body 10 and thus biases the same counter to the force of the closing spring 11 and of the pressure there entrapped. In addition, the pressure of the pressure spring 34 acts upon the valve body 10 via the valve body 27, so that altogether or at appropriate pressure level in any case an opening movement of the check valve 10, 4 takes place, so that the pressure compensation occurs. Because of the flow of the pressure medium from the line connected with the socket valve 2 in the direction towards the line of the plug valve 1, this pressure also acts upon the rear side of the valve body 27 whereby this movement is aided by the force of the pressure spring 34. In this manner the valve body 27 again moves through the single valve stroke a' towards the right, taking the valve body 10 along and of course also performing the single valve stroke a' until its shaft 9 engages the fixed abutment 14. This position of the parts is shown in FIG. 4. During this movement, which the valve body 27 carries out jointly with the star body 20, without the shaft 26 becoming disengaged from the abutment 30, the sliding sleeve 23 of the star body also shifts so far towards the right that the locking groove 48 moves into the range of the balls 47 so that in addition to the first ball-locking arrangement the second ball-locking arrangement 43–48 can now also close. This closing position is made possible in the embodiments of FIGS. 5–8 by the axially shiftable mounting of the locking cam 43 and the force of the spring 54. Both of the first ball-locking arrangement 15, 37–41 and also the second ball-locking arrangement 43–48 are then in the locked position, as shown in FIGS. 4 respectively 8. A further mark 52 (FIG. 4) on the outer circumference of the coupling body 16 thus becomes visible relative to the end of the sliding sleeve 35 when the same has been shifted in accordance with the arrow 53 into the end position shown in FIG. 4. The outer circumference of the sliding sleeve 35 in combination with a recess 56 indicates that the locking cam 43 has shifted according to arrow 53 into the end position shown in FIG. 8. The marks 51 and 52 reliably indicate that both ball-locking arrangements are locked. This means that the abutment 30 is also again engaged, i.e. effective. The two valve bodies 10 and 27 are thus in fixedly arrested position between the abutments 14 and 30, so that even pressure fluctuations of the pressure medium cannot lead to any significant shifting of the valve bodies 10, 27 in the parts 1, 2 of the quick coupling. This consideration presupposes that the end face 12 of the plug valve 1 and the end of the socket valve 2 are located in a common end plane in the coupled position, as shown in FIG. 4.

For uncoupling the sliding sleeve 35 is moved from the position of FIG. 4–8 either in direction of the arrows 49 or in the opposite direction, so that the two ball-locking arrangements 15, 37–41 and 43–48 are unlocked. Depending upon the prevailing pressure conditions the plug valve 1 is pushed out of the socket valve 2, and both check valves 10, 4 and 22, 27 move to closed position as shown in FIGS. 1 respectively 5.

The embodiment shown in the upper halves of FIGS. 1–4 respectively 5–8 has an analogous effect, but here the star body 20 is shifted jointly with the seat sleeve 19. The drawings show the various intermediate positions under the precondition that the pressure spring 34 is stronger than the closing spring 31. If, on the other hand, one makes the closing spring 31 stronger than the pressure spring 34, then this would have a somewhat different effect. In the intermediate position according to FIGS. 2 respectively 6 the possibly desired advantage would then be obtained that both the check valves 4, 10 and 22, 27 would be closed in this intermediate position. If one then additionally selects the dimension b at least twice as large as the single valve stroke a', such a coupling could be completely closed with respect to its first ball-locking arrangement, and in this closing position both check valves 10, 4 and 22, 27 would still be in the locking position. However, by appropriate pressure build up respectively pressure decrease or in other manner it would then have to be achieved that both check valves can reach an open position according to FIGS. 4 respectively 8 and that an appropriate locking of this position is effected.

It is understood that in the illustrated embodiments the quick coupling naturally can be coupled and uncoupled even if none of the two lines connected respectively to the plug valve 2 and to the socket valve 2 are under pressure during the coupling respectively uncoupling operation. In such a case, depending upon the coordination of the springs 11, 31, 34 with reference to one another, a different sequence of movements of the individual valve bodies relative to the coupling bodies 3 respectively 16 will then occur. If, for example, the pressure spring 34 is stronger than the closing spring 31 and the closing spring 11, with the closing spring 11 and the closing spring 31 being approximately of the same strength, then during the coupling without pressure the valve body 10 will perform the single valve stroke a', whereas the valve body 27 will perform the single valve stroke a, so that immediately the opening position of the two check valves 4, 10 and 22, 27 according to FIG. 4 will be reached. However, even in this case the locking position will immediately be reached when the coupling operation is completed and the sliding sleeve has reached its end position. The passage through the quick coupling is opened and remains opened because the valve bodies have been locked even prior to switching-on of the pressure source. A one-time closing operation in the sense of a double stroke movement is no longer necessary for achieving the locking position.

I claim:

1. Quick coupling which is operable even under pressure, particularly for hydraulic lines, comprising: two coupling halves which can be pushed into one another; first ball-locking means for locking said coupling halves in a coupled position, said coupling halves comprising a plug and a socket valve with a respective valve body which is urged in closing direction by closing springs and in the uncoupled position of the coupling halves maintained in closed position and guided in a star mounted in a coupling body, said plug and said socket each having a respective coupling body and a respective star body; one coupling half having a fixed abutment for limiting the stroke of the respective valve body in its open position, the respective valve body of the other coupling half performing a stroke equal to double the valve stroke of the respective other valve body, a displaceable abutment at the end of the single valve stroke and having second ball-locking means actuatable from the outside for releasing the double valve stroke respectively for locking said valve body in an open position corresponding to the single valve stroke, the star body of the coupling half having the double valve stroke being axially shiftable in said coupling body at least according to the single valve stroke, sleeve means coaxial with said coupling body for mounting said star body, said abutment being located between said sleeve means and the coupling body, and outside of fluid flow cross-section of the coupling.

2. Quick coupling according to claim 15, including a seat sleeve between said star body including said displaceable abutment and said coupling body for carrying seating means against which said star body is supported and between which said coupling body and said abutment is provided.

3. Quick coupling according to claims 1 or 2, including a pressure spring, said star body including said displaceable abutment being supported against said coupling body by said pressure spring acting in closing direction of the valve body, said pressure spring being stronger than a closing spring of the valve body.

4. Quick coupling according to claims 1 or 2, wherein said star body including said displacement abutment is shiftably mounted in said coupling body with a larger stroke than the single valve stroke of its valve body.

5. Quick coupling according to claim 1, wherein said displaceable and said fixed abutments are adjustable.

6. Quick coupling according to claim 1, wherein said displaceable abutment for the stroke of the valve body comprises said ball-locking means and a setting screw mounted in the star body.

7. Quick coupling according to claim 6, including a sliding sleeve for activation of said second ball-locking means, said sliding sleeve being shiftable on the circumference of said coupling body against spring pressure for permitting release of the second ball-locking means in both operating directions.

8. Quick coupling according to claim 6, including a common sliding sleeve for activation of the second ball-locking means of the said displaceable abutment and the first ball-locking means for coupling and uncoupling of said two coupling halves.

9. Quick coupling according to claim 8, wherein said common sliding sleeve has one each locking cam and adjacent at least at one side shunting grooves for balls of the two ball locking means, the two locking cams being coordinated with one another and the locking cam of the second ball-locking means of the said abutment having a comparably smaller axial width.

10. Quick coupling according to claim 9, wherein said coupling body has relative to the sliding sleeve at least one mark for indicating the coupled condition.

11. Quick coupling according to claim 8, including a locking cam on said sleeve and axially shiftably mounted on said common sliding sleeve and being spring biased in the center position of its stroke.

12. Quick coupling according to claim 11, wherein said locking cam is mounted for limited axial shifting as a ring in a recess formed in said common sliding sleeve by shunting grooves, and two substantially equally strong springs located to right and left of said locking cam.

13. Quick coupling according to claim 11, wherein said locking cam has on its inner side inclined surfaces for balls of said ball-locking arrangement.

14. Quick coupling according to claim 12, wherein said two springs are arranged outside radial movement range of balls of said second ball-locking means.

* * * * *